United States Patent [19]

Emory, Jr.

[11] Patent Number: 4,527,349
[45] Date of Patent: Jul. 9, 1985

[54] TROLLING BAR ASSEMBLY

[75] Inventor: John E. Emory, Jr., Traverse City, Mich.

[73] Assignee: Big Jon, Inc., Traverse City, Mich.

[21] Appl. No.: 465,194

[22] Filed: Feb. 9, 1983

[51] Int. Cl.³ ............................................. A01K 97/10
[52] U.S. Cl. ................................... 43/21.2; 248/513; 248/520; 248/534
[58] Field of Search ................... 43/21.2, 4; 403/233, 403/234, 237, 347, 326; 248/512, 513, 520, 534, 538

[56] References Cited

U.S. PATENT DOCUMENTS

| | | |
|---|---|---|
| 2,178,655 | 11/1939 | Strandt . |
| 2,323,400 | 7/1943 | Jacobi ............................ 403/326 |
| 2,473,778 | 6/1949 | Benes . |
| 3,017,149 | 1/1962 | Bossert . |
| 3,149,524 | 9/1964 | Vecchi ............................ 403/326 |
| 3,444,643 | 5/1969 | Dobbs . |
| 3,484,066 | 12/1969 | Aunspaugh ..................... 43/21.2 |
| 3,903,634 | 9/1975 | Miyamae ......................... 43/21.2 |
| 3,952,453 | 4/1976 | Amburgey ..................... 403/233 |
| 3,964,706 | 6/1976 | Adams ............................ 43/21.2 |
| 3,968,587 | 7/1976 | Kammeraad ................... 43/21.2 |
| 4,156,982 | 6/1979 | Phillips, Jr. . |
| 4,157,803 | 6/1979 | Mack . |
| 4,157,804 | 6/1979 | Byford ............................ 248/512 |
| 4,388,774 | 6/1983 | Thoemke ....................... 43/21.2 |
| 4,405,251 | 9/1983 | Kolchinsky .................... 403/326 |

FOREIGN PATENT DOCUMENTS 2363282 5/1978 France ............................ 43/21.2

Primary Examiner—Nicholas P. Godici
Assistant Examiner—K. C. Rowan
Attorney, Agent, or Firm—Price, Heneveld, Huizenga & Cooper

[57] ABSTRACT

A trolling bar assembly includes an elongated member or board which defines a plurality of longitudinally spaced rod holder apertures, a plurality of tubular rod holders and a pair of support brackets for securing the elongated member to the boat. The tubular rod holders are retained in the apertures of the elongated bar by a pair of longitudinally spaced garter springs disposed in notches formed in the tubular holders. The support brackets are adjustable longitudinally of the bar.

3 Claims, 7 Drawing Figures

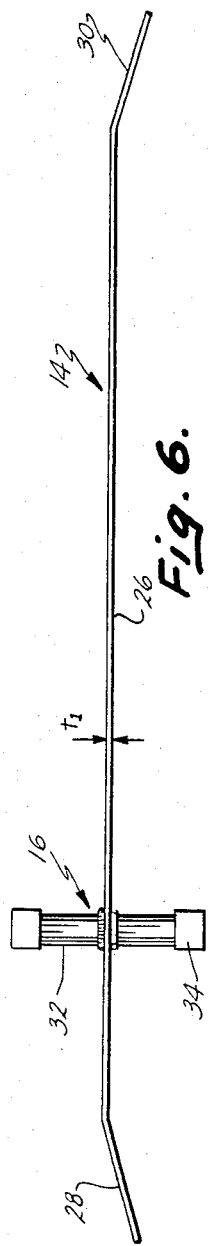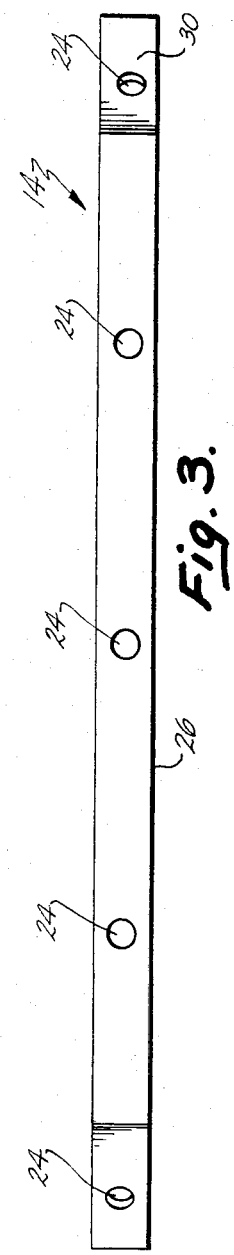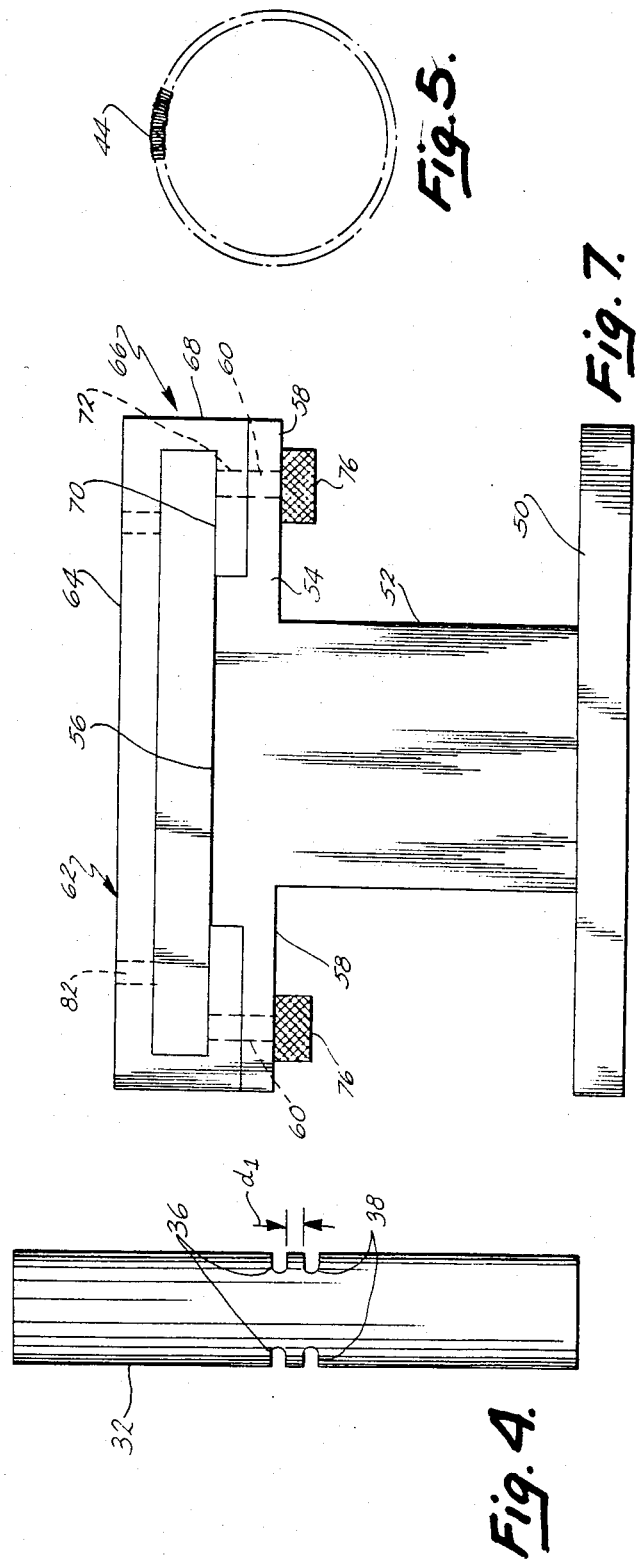

TROLLING BAR ASSEMBLY

BACKGROUND OF THE INVENTION

The present invention relates to fishing rod holders and more particularly to an assembly securable to the stern of a boat to support a plurality of rods for trolling.

Heretofore, a fairly wide variety of supports or rod holders have been proposed. Generally, such holders are clamped to the gunwale of a boat and support a single fishing rod. Examples of such may be found in U.S. Pat. No. 4,156,982 entitled SUPPORT FOR FISHING ROD and issued on June 5, 1979 to Phillips; U.S. Pat. No. 3,444,643 entitled CONTROLLING AND SENSING DEVICE FOR PLURAL TROLLING RODS and issued on May 20, 1969 to Dobbs; and U.S. Pat. No. 3,017,149 entitled FISHING ROD REST and issued on Jan. 16, 1962 to Bossert. Such rod holders are primarily adapted for limited trolling or for stationary fishing.

In sport fishing, such as that practiced on the Great Lakes, it is common practice to use downrigger devices when trolling. The fishing line of the rod is secured to the downrigger line through a downrigger release. The downrigger is mounted adjacent the stern of the board and in close proximity to the rod holder. When trolling with multiple lines and multiple downriggers, problems are presented with efficient location of the downriggers and rods due to limited mounting areas. Available rod holders do not readily permit the use of multiple rods, nor are they readily integrated with downrigger devices. Further, problems are presented with the entanglement of the lines from the various rods.

Attempts have been made to increase the ease of mounting multiple fishing rods adjacent the stern of the boat. An example of one such approach is found in U.S. Pat. No. 4,157,803 entitled FISHING ROD HOLDER and issued on June 12, 1979 to Mack. This patent discloses a fishing rod holder device which includes an extensible telescoping body adapted to extend between the gunwales of the boat. Secured to the body are a plurality of tubular rod holders. Each of the rod holders includes a set screw-like clamping device to secure the fishing rod within the holder.

A need exists for a trolling assembly which is adapted to mount a plurality of fishing rods in an efficient manner, which is adjustable to fit a wide variety of boats, which is mountable in a secure fashion and which may be adapted to support downrigger devices and the like.

SUMMARY OF THE INVENTION

In accordance with the present invention, a trolling bar assembly is provided by which the aforementioned needs are met. Essentially, the assembly includes an elongated member which defines a plurality of spaced rod holder apertures within which are disposed a plurality of tubular rod holders. Provision is made for removably securing the rod holders to the elongated member or bar. Adjustable mounting brackets support the elongated member and secure the assembly to the stern or other area of the fishing boat. In narrower aspects of the invention, provision is made for securing downrigger devices and the like to the assembly.

BRIEF DESCRIPTION OF THE INVENTION

FIG. 3 is a top, plan view of the trolling bar or elongated member included in the assembly;

FIG. 4 is an elevational view of a tubular rod holder incorporated in the present invention;

FIG. 5 is a plan view of means for retaining the rod holder to the elongated bar;

FIG. 6 is an elevational view showing a rod holder mounted on the elongated bar; and FIG. 7 is an elevational view of a support bracket incorporated in the present invention.

DETAILED DESCRIPTION OF THE PREFERRED EMBODIMENT

Figure 1:
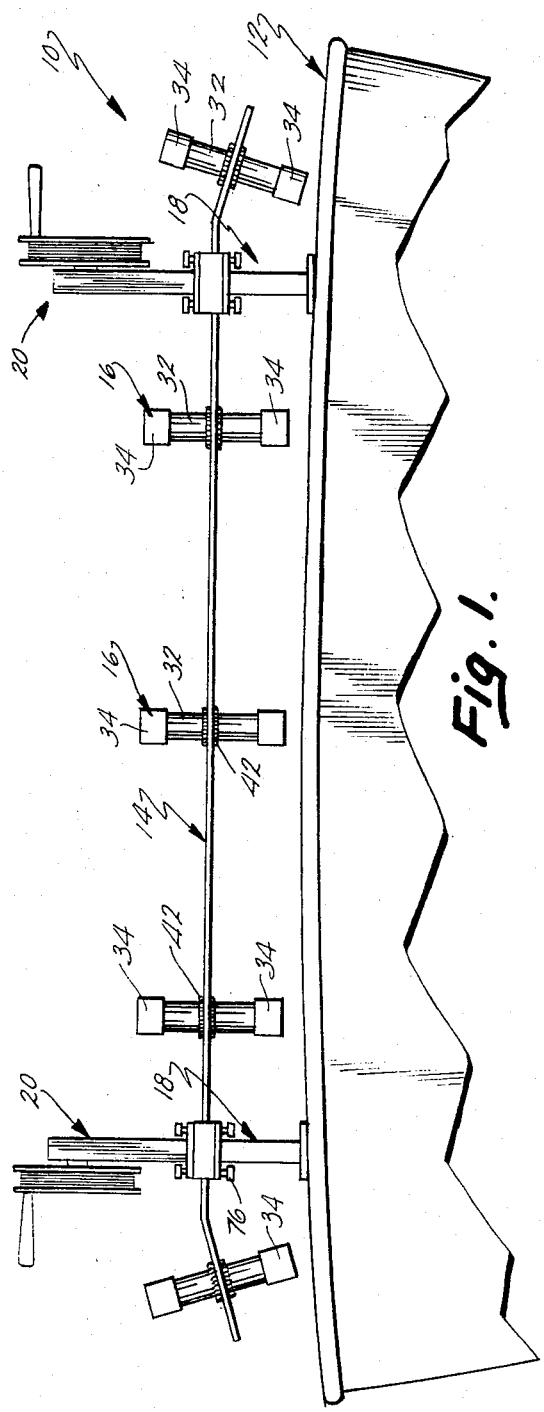
FIG. 1 is a fragmentary, rear elevational view showing the trolling bar assembly in accordance with the present invention secured to the stern of a fishing boat.
Figure 2:
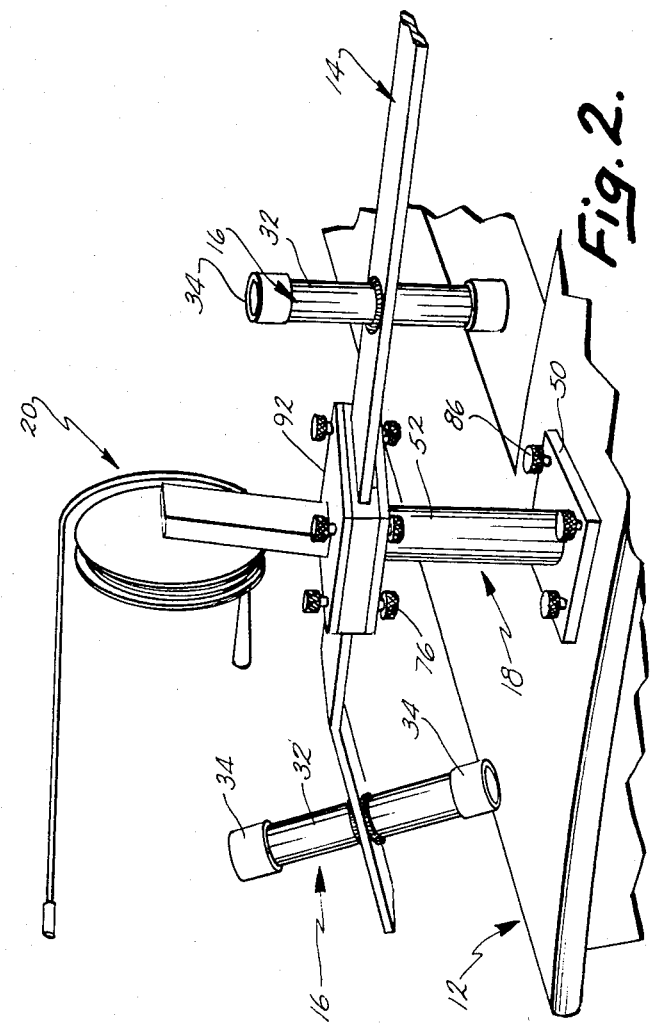
FIG. 2 is a fragmentary, perspective view of a portion of the assembly.

A preferred embodiment of a trolling bar assembly in accordance with the present invention is illustrated in FIG. 1 and generally designated 10. Assembly 10 is shown secured to stern 12 of a fishing boat. Assembly 10 includes an elongated trolling bar or member 14, a plurality of fishing rod holders 16 and support brackets or stanchion bases 18. As shown in FIGS. 1 and 2, downrigger devices 20 may be secured to the assembly.

As best seen in FIGS. 1 and 3, trolling bar 14 is an elongated, generally planar member which defines a plurality of rod holder apertures 24. Member 14 includes an elongated central portion 26 and downwardly angled end portions 28, 30. In the embodiment illustrated, five rod holder apertures extend through the upper and lower faces of member 14. A single aperture 24 is formed in each of the downwardly angled end portions 28.

Apertures 24 are circular and dimensioned to receive rod holders 16. Each rod holder 16 includes a cylindrical, tubular member 32 which is open at each end. As seen in FIGS. 1 and 2, sleeve 34 are slipped over the ends of each tube 32. The sleeves are formed from any suitable material such as a thermoplastic and protect a rod disposed therein in a conventional fashion. As best seen in FIG. 4, tube 32 is formed with two pairs of longitudinally spaced, opposed notches 36, 38. The notches are generally semicircular in elevation and open through the outer peripheral surface of the rod holder. Notches 36 are spaced from notches 38 a distance $d_1$. Dimension $d_1$ is slightly greater than or at least equal to the thickness $t_1$ (FIG. 6) of the trolling bar or elongated member 14.

Each fishing rod holder 16 carries a pair of retaining means 42. In the preferred form, retaining means 42 comprise generally circular, garter springs 44 (FIG. 5). To secure a fishing rod holder 16 to the bar 14 at a fishing rod aperture 24, the tube is inserted into the aperture and garter springs 44 are placed on the tube from each end. Garter springs 44 are moved towards each other until they are received in a respective set of notches 36, 38. The springs sandwich the trolling bar 14 and secure the rod holder at its respective aperture 24.

Support brackets or stanchion bases 18 are adjustable along elongated bar 14. As seen in FIG. 7, each support bracket 18 includes a base plate 50, a support post 52 secured to the base plate 50 and a top plate structure 54. Top plate 54 includes a planar central portion 56 and outwardly extending, lateral mounting flanges 58. The mounting flanges define threaded apertures or bores 60. A bracket member or clamp 62 is secured to flanges 58. Member 62 includes a central base or planar portion 64 and depending, generally L-shaped side portions 66 which define a channel. Side portions 66 include sidewalls 68 and inwardly directed, opposed flanges 70. Flanges 70 define threaded apertures or bores 72 which are coaxially aligned with bores 60. To secure board 14 to the brackets, bracket piece 62 is slipped over the ends of the board and suitable threaded fasteners or bolts 76 are threaded through passages 60, 72. The board is clamped or sandwiched between bracket 62 and top plate 54.

Base plate 50 is provided with suitable apertures therethrough, as shown in FIG. 2. Further, the top bracket, as shown in FIG. 7, is provided with threaded apertures or bores 82. The stanchion bases or support brackets 18 are secured at a suitable location on the stern of boat 12 by threaded fasteners or bolts or the like 86 which pass through the apertures formed in base plate 50. As seen in FIGS. 1 and 2, downrigger devices 20 or other accessories which include a base plate 92 may be secured to the top bracket member 62 at the threaded apertures or bores 82.

Elongated bar 14, holders 16 and support brackets 18 are easily fabricated from readily available materials, such as annodized aluminum. Bar 14 is, for example, an easily stamped member. To assemble the structure, brackets 18 are positioned on bar 14 between the end portions 28, 30 and the next adjacent rod holder apertures 24. Tubes 32 of the rod holder 16 are positioned within a respective aperture 24 and garter springs 44 are moved into their respective notches. Base plates 50 of each stanchion bracket may then be positioned by moving the bracket along the bar 14 to a suitable location at the stern of the fishing boat 12. Suitable fasteners then secure these brackets to the boat. If desired, downrigger devices 20 may then be secured to the bracket supports at bores 82.

The trolling bar may be fabricated in various lengths and may support more or less than the five rod holders illustrated. The configuration of the board insures adequate spacing between adjacent rod holders. The angled end portions direct the end rod holders and rods outwardly away from the center holder. This increases the spacing between lines and limits interference.

The assembly provides a strudy, rigid mount or support for a pluality of rod holders and downrigger devices. The assembly is readily adapted to a wide variety of boats. The assembly makes trolling easier.

In view of the above description, those of ordinary skill in the art will undoubtedly envision various modifications which would not depart from the inventive concepts disclosed herein. For example, retaining means other than the garter springs could be used to secure the rod holders to the elongated bar 14. For example, retainer rings or the like could be employed. It is therefore intended that the above description should be considered as only that of the preferred embodiment. The true spirit and scope of the present invention may be determined by reference to the appended claims.

The embodiments of the invention in which an exclusive property or privilege is claimed are defined as follows.

1. A support assembly attachable to the stern of a boat and adapted to support a plurality of fishing rod holders, said support assembly comprising:
   an elongated, generally planar member, said member defining a plurality of rod holder apertures; and
   a pair of adjustably positionable mounting brackets for mounting the elongated member to a boat, said brackets each including:
   a base plate;
   a support post secured to said base plate; and
   channel means secured to said support post opposite said base plate for slidably receiving said elongated member, said channel means comprising:
   a top plate having a central planar portion with lateral flanges defining recesses at each side thereof;
   a bracket member including a top, central, planar wall with L-shaped depending side flanges defining a channel between said wall and each of the lower legs of said L-shaped flanges for receiving the elongated planar member, said lower legs being seated in the said recesses of said top plate; and
   means engaging said lateral flanges of said top plate for securing said bracket member to said top plate for clamping said elongated member disposed inbetween said top plate and bracket member.

2. A support assembly as defined by claim 1 wherein said means engaging said top plate include fasteners extending through said lateral flanges and engaging said mounting flanges.

3. A support assembly as defined by claim 1 wherein said elongated member includes an elongated central portion and end portions angled downwardly with respect to said central portion.

* * * * *